United States Patent
Bergman et al.

(10) Patent No.: US 12,116,686 B2
(45) Date of Patent: Oct. 15, 2024

(54) PARAMETER ADJUSTMENT MODEL FOR SEMICONDUCTOR PROCESSING CHAMBERS

(71) Applicant: Applied Materials, Inc., Santa Clara, CA (US)

(72) Inventors: Eric J. Bergman, Kalispell, MT (US); Adam Marc McClure, Kalispell, MT (US); Paul R. McHugh, Kalispell, MT (US); Gregory J. Wilson, Kalispell, MT (US); John L Klocke, Kalispell, MT (US)

(73) Assignee: Applied Materials, Inc., Santa Clara, CA (US)

( * ) Notice: Subject to any disclaimer, the term of this patent is extended or adjusted under 35 U.S.C. 154(b) by 0 days.

(21) Appl. No.: 17/670,310

(22) Filed: Feb. 11, 2022

(65) Prior Publication Data

US 2023/0257900 A1    Aug. 17, 2023

(51) Int. Cl.
C25D 21/12    (2006.01)
C25D 7/12    (2006.01)
(Continued)

(52) U.S. Cl.
CPC ............. *C25D 21/12* (2013.01); *C25D 7/123* (2013.01); *C25D 17/001* (2013.01); *G05B 13/027* (2013.01)

(58) Field of Classification Search
CPC ............ C25D 7/12–123; C25D 17/001; H01L 21/2885; H01L 21/76873; H01L 2224/11462; G05B 13/027
See application file for complete search history.

(56) References Cited

U.S. PATENT DOCUMENTS 6,410,351 B1    6/2002 Bode et al.
6,444,481 B1 *    9/2002 Pasadyn ............... H01L 22/26
                                                        257/E21.585
(Continued)

FOREIGN PATENT DOCUMENTS

CN    1564970 A    1/2005
CN    106548956 A    3/2017
(Continued)

OTHER PUBLICATIONS

Application No. PCT/US2023/010336, International Search Report and the Written Opinion, Mailed On May 8, 2023, 11 pages.

*Primary Examiner* — Hosung Chung

(74) *Attorney, Agent, or Firm* — Kilpatrick Townsend & Stockton LLP

(57) ABSTRACT

A system may include a first semiconductor processing station configured to deposit a material on a first semiconductor wafer, a second semiconductor processing station configured perform measurements indicative of a thickness of the material after the material has been deposited on the first semiconductor wafer, and a controller. The controller may be configured to receive the measurements from the second station; provide an input based on the measurements to a trained model that is configured to generate an output that adjusts an operating parameter of the first station such that the thickness of the material is closer to a target thickness; and causing the first station to deposit the material on a second wafer using the operating parameter as adjusted by the output.

17 Claims, 9 Drawing Sheets

(51) Int. Cl.
*C25D 17/00* (2006.01)
*G05B 13/02* (2006.01)

(56) References Cited

U.S. PATENT DOCUMENTS

| | | | |
|---|---|---|---|
| 6,664,122 B1 * | 12/2003 | Andryuschenko | ............................ C23C 18/1675 257/E21.174 |
| 6,895,295 B1 | 5/2005 | Grover et al. | |
| 7,445,945 B1 | 11/2008 | Markle et al. | |
| 2003/0014145 A1 * | 1/2003 | Reiss | ................. G05B 23/0286 700/121 |
| 2005/0183959 A1 * | 8/2005 | Wilson | ................... C25D 7/123 205/157 |
| 2015/0303065 A1 * | 10/2015 | Buckalew | ......... H01L 21/76862 204/275.1 |
| 2016/0237571 A1 * | 8/2016 | Liu | ........................... C25D 3/38 |
| 2020/0083080 A1 | 3/2020 | Clark et al. | |
| 2020/0243359 A1 | 7/2020 | Hao et al. | |

FOREIGN PATENT DOCUMENTS

| | | |
|---|---|---|
| TW | 580723 B | 3/2004 |
| TW | 201606872 A | 2/2016 |

* cited by examiner

PARAMETER ADJUSTMENT MODEL FOR SEMICONDUCTOR PROCESSING CHAMBERS

TECHNICAL FIELD

This disclosure generally relates to adjusting parameters in a recipe run by a semiconductor processing station. More specifically, this disclosure describes using and training a model to generate adjustments for operating parameters of a station.

BACKGROUND

Electroplating uses electrodeposition to coat an object in a layer of metal. Generally, an anode and a cathode are placed in an electrolyte chemical bath and exposed to an electrical current. Electricity causes negatively charged anions to move to the anode and positively charged cations to be transferred to the cathode. This process covers or plates the desired part of the cathode with an even metal coating from the anode material. While electroplating has applications in many different industries, this technique is extensively used in semiconductor manufacturing processes to uniformly deposit a layer of metal on a semiconductor wafer. Electrochemical deposition chambers may submerge the semiconductor wafer in a chemical bath of an electrolyte liquid. Anodes may be distributed throughout the chemical bath to provide electrical current through the electrolyte to the wafer, which acts as the cathode in the reaction. The thickness of the metal film can be tightly controlled based on the current levels and run-time of the process.

SUMMARY

In some embodiments, a system may include a first semiconductor processing station configured to deposit a material on a first semiconductor wafer; a second semiconductor processing station configured perform measurements indicative of a thickness of the material after the material has been deposited on the first semiconductor wafer; and a controller configured to perform operations including receiving the measurements from the second semiconductor processing station; providing an input based on the measurements to a trained model, where the trained model may be configured to generate an output that adjusts an operating parameter of the first semiconductor processing station such that the thickness of the material is closer to a target thickness of the material; and causing the first semiconductor processing station to deposit the material on a second semiconductor wafer using the operating parameter as adjusted by the output.

In some embodiments, a non-transitory computer-readable medium may sotre instructions that, when executed by one or more processors, cause the one or more processors to perform operations including receiving measurements from a second semiconductor processing station, where a first semiconductor processing station may be configured to deposit a material on a first semiconductor wafer; and the second semiconductor processing station may be configured to perform the measurements indicative of a thickness of the material after the material has been deposited on the first semiconductor wafer. The operations may also include providing an input based on the measurements to a trained model, where the trained model may be configured to generate an output that adjusts an operating parameter of the first semiconductor processing station such that the thickness of the material is closer to a target thickness of the material. The method/operations may also include causing the first semiconductor processing station to deposit the material on a second semiconductor wafer using the operating parameter as adjusted by the output.

In some embodiments, a method of adjusting recipe parameters for a semiconductor process may include receiving measurements from a second semiconductor processing station, where a first semiconductor processing station may be configured to deposit a material on a first semiconductor wafer; and the second semiconductor processing station may be configured to perform the measurements indicative of a thickness of the material after the material has been deposited on the first semiconductor wafer. The method may also include providing an input based on the measurements to a trained model, wherein the trained model is configured to generate an output that adjusts an operating parameter of the first semiconductor processing station such that the thickness of the material is closer to a target thickness of the material. The method may further include causing the first semiconductor processing station to deposit the material on a second semiconductor wafer using the operating parameter as adjusted by the output.

In any embodiments, any and all of the following features may be implemented in any combination and without limitation. The first semiconductor processing station may include an electrochemical deposition station. The second semiconductor processing station may include a metrology station that performs parametric measurements on the first semiconductor wafer. The method/operations may also include a third semiconductor processing station configured to remove a photoresist layer from the first semiconductor wafer, where the third semiconductor processing station may receive the first semiconductor wafer after being processed by the first semiconductor processing station and before being processed by the second semiconductor processing station. The method may additionally include a third semiconductor processing station configured to perform a rinse and dry process on the first semiconductor wafer, where the third semiconductor processing station may receive the first semiconductor wafer after being processed by the first semiconductor processing station and before being processed by the second semiconductor processing station. The measurements indicative of the thickness of the material may include a step-height measurement of the material. The measurements indicative of the thickness of the material may include a conductivity or resistivity measurement of the material used to extrapolate or calculate the thickness of the material. The controller may include a central computer system that is in communication with the first semiconductor processing station and the second semiconductor processing station. The controller may include a first integrated controller for the first semiconductor processing station in communication with a second integrated controller for the second semiconductor processing station. The output that adjusts the operating parameter of the first semiconductor processing station may include a current to be applied to and anode of the first semiconductor processing station. The output that adjusts the operating parameter of the first semiconductor station may include a process time for a step in a recipe executed by the first semiconductor station. The trained model may include a neural network. The input based on the measurements may include an error calculation that is generated using a measured value from the first semiconductor wafer and a target value for the first semiconductor wafer. The method/operations may also include providing the error calculation to an optimizer that is configured to use one or more sensitivity curves that relate the error calculation to a change in the operating parameter of the first semiconductor processing station; providing the change and the error calculation to the trained model to generate the output that adjusts the operating parameter of the first semiconductor processing station; determining whether the error calculation violates a threshold; and/or training the model using the input based on the measurements as labeled data that does not require an adjustment by the trained model.

BRIEF DESCRIPTION OF THE DRAWINGS

A further understanding of the nature and advantages of various embodiments may be realized by reference to the remaining portions of the specification and the drawings, wherein like reference numerals are used throughout the several drawings to refer to similar components. In some instances, a sub-label is associated with a reference numeral to denote one of multiple similar components. When reference is made to a reference numeral without specification to an existing sub-label, it is intended to refer to all such multiple similar components.

DETAILED DESCRIPTION

Figure 1:
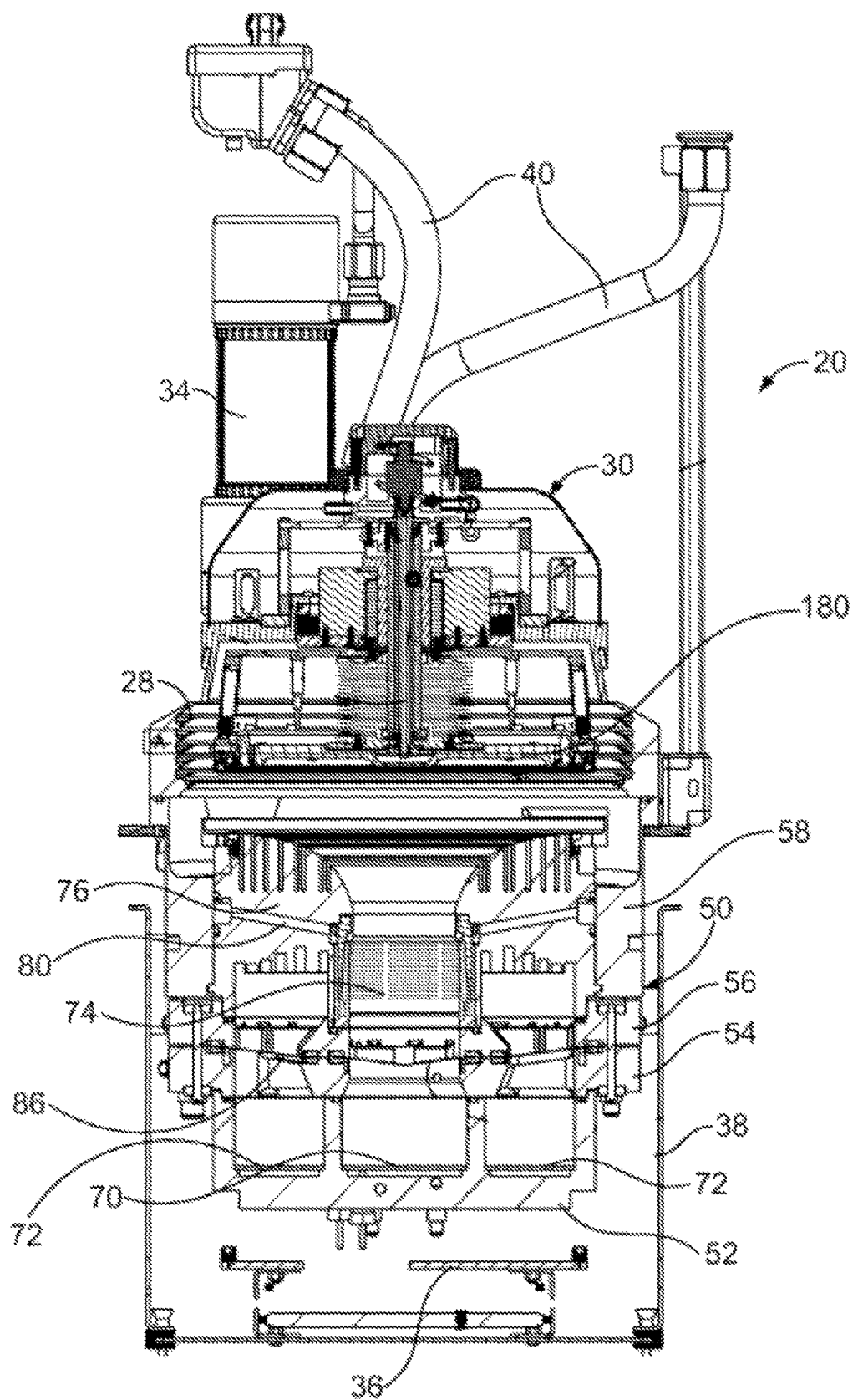
FIGS. 1-2 illustrate an electrochemical processor, according to some embodiments.
Figure 2:
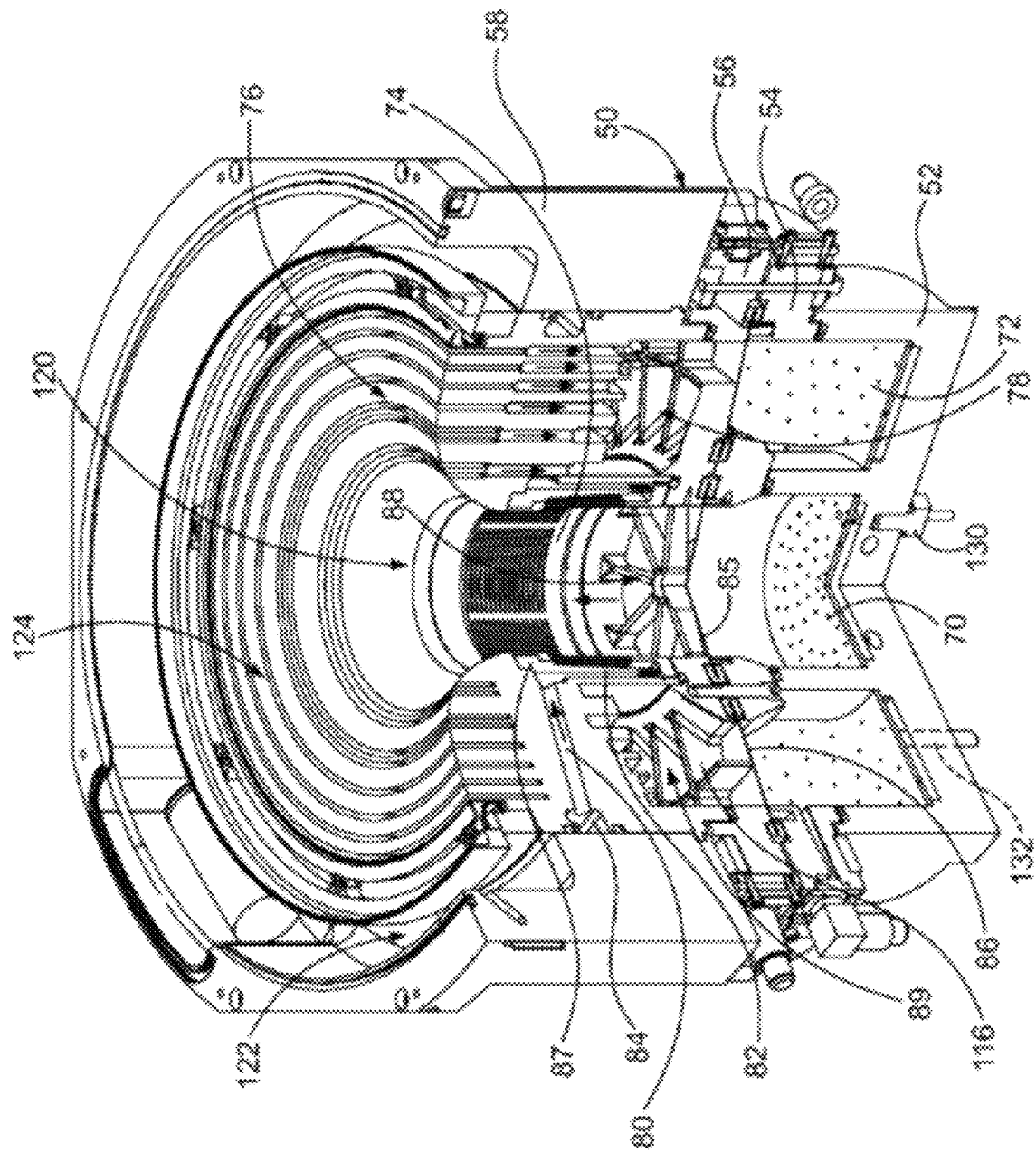

FIGS. 1-2 illustrate an electrochemical processor 20, according to some embodiments. The electrochemical processor 20 may include a head positioned above a vessel assembly 50. The vessel assembly 50 may be supported on deck plate 24 and a relief plate 26 attached to a stand 38 or other structure. A single processor 20 may be used as a standalone unit. Alternatively, multiple processors 20 may be provided in arrays with workpieces loaded and unloaded in and out of the processors by one or more robots. A head 30 may be supported on a lift/rotate unit 34, for lifting and inverting the head to load and unload a workpiece into the head, and for lowering the head 30 into engagement with the vessel assembly 50 for processing.

Electrical control and power cables 40 may be linked to the lift/rotate unit 34 and to internal head components and may lead up from the processor 20 to facility connections, or to connections within multi-processor automated system. A rinse assembly 28 having tiered drain rings may be provided above the vessel assembly 50. A drain pipe 42 may connect the rinse assembly 28, if used, to a facility drain. An optional lifter 36 may be provided underneath the vessel assembly 50 to support the anode cup during changeover of the anodes. Alternatively, the lifter 36 may be used to hold the anode cup up against the rest of the vessel assembly 50.

The vessel assembly 50 may include an anode cup 52, a lower membrane support 54, and upper membrane support 56 held together with fasteners 60. Within the anode cup 52, a first or inner anode 70 may be positioned near the bottom of an inner anolyte chamber 110. A second or outer anode 72 may be positioned near the bottom of an outer anolyte chamber 112 surrounding the inner anolyte chamber 110. The inner anode 70 may be a flat round metal plate, and the outer anode 72 may be flat ring-shaped metal plate, for example, a platinum plated titanium plate. The inner and outer anolyte chambers may be filled with copper pellets. The inner anode 70 may be electrically connected to a first electrical lead or connector 130, and the outer anode 72 may be electrically connected to a separate second electrical lead or connector 132. In some embodiments, for example for processing 300 mm diameter wafers, the processor may have a center anode, and a single outer anode. Designs having three or more anodes may also optionally be used, especially with even larger wafers.

An upper cup 76 may be contained within or surrounded by an upper cup housing 58. The upper cup housing 58 may be attached to and sealed against the upper cup 76. The upper cup 76 may have a curved upper surface 124 and a central through opening that forms a central or inner catholyte chamber 120. This chamber 120 is defined by the generally cylindrical space within a diffuser 74 leading into the bell or horn shaped space defined by the curved upper surface 124 of the upper cup 76. A series of concentric annular slots extend downwardly from the curved upper surface 124 of the upper cup 76. An outer catholyte chamber 78 formed in the bottom of the upper cup 76 is connected to the rings via an array of tubes or other passageways.

Similarly, a second or outer membrane 86 may be secured between the upper and lower membrane supports and may separate the outer anolyte chamber 112 from the outer catholyte chamber 78. An outer membrane support 89, which may be provided in the form of radial legs 116 on the upper membrane support 56, supports the outer membrane from above.

A diffuser circumferential horizontal supply duct 84 may be formed in an outer cylindrical wall of the upper cup 76, with the duct 84 sealed by O-rings or similar elements between the outer wall of the upper cup 76 and the inner cylindrical wall of the upper cup housing 58. Radial supply ducts 80 may extend radially inwardly from the circumferential duct 84 to an annular shroud plenum 87 surrounding the upper end of the diffuser shroud 82. The radial ducts 80 pass through the upper cup 76 in between the vertical tubes connecting the annular slots in the curved upper surface 124 of the upper cup 76 to the outer catholyte chamber 78. The circumferential duct 84 and the radial ducts 80 lead to the shroud plenum 87, and the outer catholyte paths may be formed between the diffuser shroud 82 and the diffuser 74. These outer catholyte paths may ordinarily be filled with liquid catholyte during operation of the processor 20.

In use, a workpiece, typically having an electrically conductive seed layer, is loaded into the head. The seed layer on the workpiece is connected to an electrical supply source, typically to the cathode. If the head is loaded in a face up position, the head is flipped over so that the rotor, and the workpiece held in the rotor, are facing down. The head is then lowered onto the vessel until the workpiece is in contact with the catholyte in the vessel. The spacing between the work piece and the curved upper surface of the upper cup influences the current density uniformity at the workpiece Surface. This gap may be changed during processing. The workpiece may be moved up and away from the surface gradually, or it may be moved quickly from a starting gap to an ending gap. A lift/rotate mechanism may be used to lift the head.

Anolyte is provided into the inner anolyte chamber and separately into the outer anolyte chamber. Catholyte is provided into the circumferential supply duct. Catholyte is supplied to the inlet fitting. The workpiece is moved into contact with the catholyte, typically by lowering the head. Electrical current to the anodes 70 and 72 is switched on with current flowing from the anodes through the anolyte in the inner and outer anolyte chambers. The electrical current from the inner and outer anodes passes through the anolyte and through the inner and outer membranes and into the catholyte contained in the open spaces in the upper cup 76.

Within the upper cup 76, catholyte flows from the supply duct 84 radially inwardly to the diffuser shroud plenum 87 and then into the diffuser 74. The catholyte flows up from the diffuser and moves radially outwardly in all directions over the curved upper surface 124 of the upper cup 76. Metal ions in the catholyte deposit onto the workpiece, building up a metal layer on the workpiece. The motor may be switched on to rotate the rotor and the workpiece, to provide more uniform deposition onto the workpiece. Most of the catholyte then flows into the collection ring 122. A small fraction of the catholyte flows downwardly through the slots and the tubes into the outer catholyte chamber 78. The catholyte then flows out of the processor 20.

The semiconductor processing chamber illustrated above in FIGS. 1-2 may be configured to execute a process on a semiconductor wafer that is at least partially submerged in a liquid within the semiconductor chamber. For example, an electroplating process may be performed on the semiconductor wafer by submerging the wafer and electrolyte and allowing the wafer to act as a cathode with a corresponding anode. When electrical current is allowed to flow through the anode and cathode, the electroplating process may produce a metal coating on the wafer through the reduction of cations of the metal on the anode.

In the manufacture of semiconductor devices, electrochemical deposition of conductive materials is of critical importance. Device parameters are becoming more stringent and the value of the devices continues to increase. This trajectory is likely to continue as device features continue to shrink in size and semiconductor wafers become more complex. One of the particular challenges in the field of electrochemical deposition (ECD) is the creation of a uniform deposit so as to maintain device performance within specified parameters. Device geometries, pattern density, topography, conductivity, paddle parameters (speed, acceleration, stroke, motion profile, etc.), temperature, and bath composition all have an impact on the uniformity of the deposited film. With so many parameters, creating a process recipe to deliver the desired outcome can be difficult and may require several iterations to achieve an acceptable result.

Although many different types of ECD chambers exist, a basic process for adjusting the input parameters that control the ECD process may proceed as follows. Each iteration may include some or all of the following steps: (1) taking measurements on a production wafer or a representative test wafer (2) adjusting the bath chemistry to within acceptable parameters, which may include metal concentration, acid concentration, conductivity, temperature and additive concentrations, (3) defining an electrical current profile to apply to each anode and/or cathode in the processing chamber in the electroplating recipe, (4) processing the wafer, (5) stripping the dielectric or photoresist layer, (6) making a series of parametric measurements to determine thickness, uniformity, quality, etc. of the deposited material, (7) assessing the results, (8) and adjusting one or more operating parameters for the ECD chamber, and repeating until the process results meet the necessary criteria.

The above technique may be used to "dial-in" the uniformity of the electrochemical deposit. In some embodiments, a surface profilometer may be used to measure the height of the deposited film in multiple locations on the wafer. These measurements may reveal the uniformity of the deposit, and may be made at specific radii under the assumption that all points at a given radius are roughly equal, particularly if the wafer is rotating during the deposition process. Multiple points may also be averaged at or near the same radius, and this average value may be used to develop a model of the uniformity of deposit.

Once these measurements are obtained, they may be used with a detailed knowledge of the ECD chamber to perform a predictive calculation, often referred to as "modeling" or "process modeling" to determine changes in the current distribution to the various anodes, which when implemented are more likely to converge towards a more desirable (i.e. more uniform) deposit in order to meet the specified criteria. The detailed knowledge of the deposition chamber design may include information such as (1) the number of anodes, (2) the anode/cathode spacing, (4) resistive features in the chamber, (5) zones of influence for each anode, etc., (6) a knowledge of the device geometry, (7) paddle parameters, such as speed, acceleration, stroke, motion profile, etc., and/or any other open area or bath conditions, such as temperature, conductivity, etc.

Considering this large number of chamber, process, and wafer characteristics that may affect the uniformity of the material deposit, a technical problem exists when attempting to optimize the input parameters of the recipe run by the ECD chamber. Specifically, the large number of input parameters for any optimization algorithm or process makes finding an optimal solution very difficult without making significant compromises and simplifications. Existing techniques take multiple iterations to converge on an optimal solution, often requiring four or more test wafers to be processed and evaluated.

The embodiments described herein present a process flow by which the optimization steps may be integrated to eliminate or limit human intervention and more rapidly iterate process changes to achieve the desired electrochemical deposition criteria. The deposition equipment may incorporate a process chamber to automatically strip dielectric films, where necessary, as part of the process flow and then proceed to make the requisite metrology measurements to determine uniformity. These measured values may then be fed back into a trained model to adjust the set of process parameters (e.g., the anode current distributions), and then load the new parameters into the tool semiconductor as a recipe to process the next wafer. Thus, these embodiments use artificial intelligence used to evaluate and improve process performance until the desired thickness of the deposited material is achieved.

Figure 3:
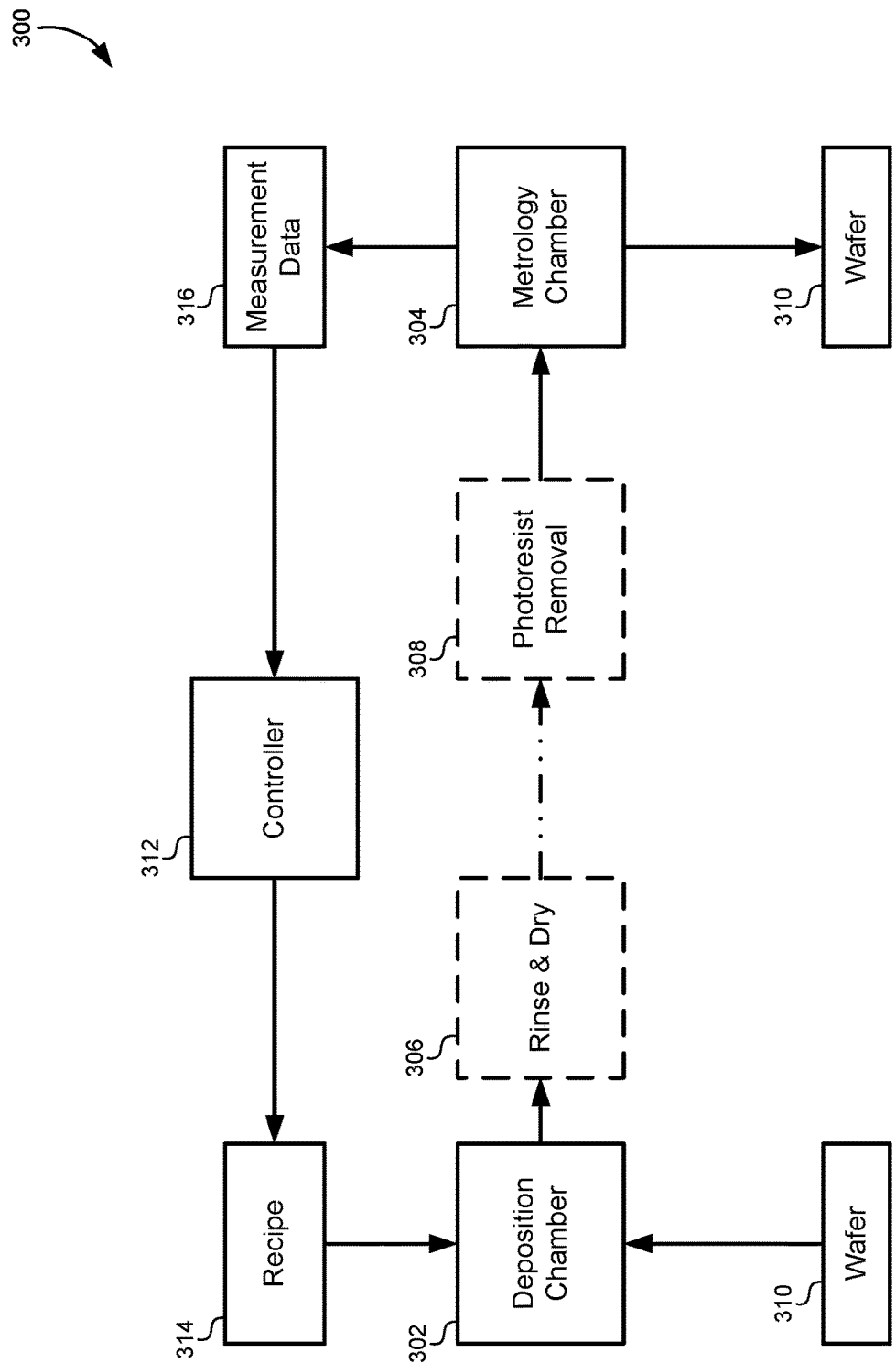
FIG. 3 illustrates a simplified block diagram of a system for optimizing the parameters used in a deposition process in order to achieve a uniform film thickness, according to some embodiments.

FIG. 3 illustrates a simplified block diagram of a system 300 for optimizing the parameters used in a deposition process in order to achieve a uniform film thickness, according to some embodiments. The system may include a first semiconductor processing station 302 that is configured to deposit a material on a first semiconductor wafer 310. For example, the first semiconductor processing station 302 may include a deposition chamber, such as an ECD chamber. Although not shown explicitly, automated machinery, such as robotic arms and transports may be used to load the first semiconductor wafer 310 into the first semiconductor processing station 302. Additionally, many different processing chamber types exist for depositing or growing a film on a semiconductor wafer. These processing station types may include sputtering chambers, chemical vapor deposition chambers, and many other chamber types that result in a film of material on the semiconductor wafer. Thus, the ECD chamber described herein is used only by way of example and is not meant to be limiting, and the first semiconductor processing station 302 may include any type of station that causes a film on the semiconductor wafer.

The first semiconductor processing station 302 may operate using a "recipe" 314. The recipe 314 may include many different parameters that govern the deposition process. These parameters may include current distributions that are delivered to individual channels or anodes in the first semiconductor processing station 302. The parameters may also include processing times for individual steps in the recipe. Other parameters may include chemistries, concentrations, flow rates, and bath levels of an electrolyte or other liquid in the first semiconductor processing station. Some embodiments may include a paddle or agitator that strokes the liquid back and forth, and parameters may therefore include a speed, acceleration, reversal point, and other characteristics of the paddle or agitator. The parameters may also include a vertical position of the first semiconductor wafer 310 relative to the first semiconductor processing station 302, as well as a rotation speed of the first semiconductor wafer 310. The recipe 314 may be provided as a list of data values, setpoints, timing constraints, threshold levels, and so forth, to the first semiconductor processing station 302.

The recipe may be provided by a computer system, which may also be referred to more generally as a "controller" 312. An example of a computer system that may be used to implement the controller 312 is described in greater detail below. The controller 312 may be implemented by a server or central computing system that distributes recipes to a plurality of different stations and receives measurement data from a plurality of different stations. Alternatively or additionally, the controller 312 may be distributed between the different stations in a manufacturing facility. For example, the first semiconductor processing station 302 may include an integrated controller, and a second semiconductor processing station 304 may also include a separate integrated controller. Collectively, these integrated controllers may be in communication with each other, with other integrated controllers on other stations, and/or with one or more central computing systems through a wired or wireless network. These distributed computing systems and integrated controllers may collectively be referred to as the "controller" 312, even though they may be physically separated in a manufacturing facility.

The first semiconductor processing station 302 may be one of a plurality of different semiconductor processing stations in a manufacturing facility. For example, a single tool may include a plurality of ECD chambers that process semiconductor wafers in parallel. Automated or robotic tools may transport the semiconductor wafers from the ECD chambers to subsequent stations in the manufacturing process. For example, some systems may optionally include stations 306 that rinse and dry the semiconductor wafers, stations 308 that remove dielectric or photoresist layers, and other stations, such as cleaning stations, polishing stations, and so forth. Any number of intermediate process stations may be included between the first semiconductor processing station 302 and the second semiconductor processing station 304.

The system 300 may also include a second semiconductor processing station 304 that is configured to perform measurements indicative of a thickness of a material after the material has been deposited on the first semiconductor wafer 310. For example, an ECD deposition station may deposit a layer of material, such as copper, onto the first semiconductor wafer 310. The second semiconductor processing station 304 may then include a metrology station that performs parametric measurements on the semiconductor wafer and provides measurement data 316 that may be used to analyze the first semiconductor wafer 310. Measurements that may be indicative of a thickness of the material may include step-height measurements of the material obtained by a profilometer. Other measurements indicative of thickness may include a conductivity or resistivity of the material, which may be used to extrapolate or calculate a thickness of the deposited layer of material. In some embodiments, the first semiconductor processing station 302 may also record real-time voltage measurements at each of the anodes. These voltage measurements may indicate how much voltage is used at each anode to produce the target current through the anode as specified by the recipe 314.

The measurement data 316, which may also be referred to simply as the "measurements" from the second semiconductor processing station 304, may be provided to the controller 312. The controller 312 may then evaluate the measurement data 316 to determine whether the measured thickness of the material falls within a specified range according to the recipe. Because the first semiconductor wafer 310 is rotating during these processes, it may generally be assumed that a measurement is approximately constant at a given radius. Additionally, the anodes in ECD chambers ay be radially spaced within these chambers (although some chambers may include one or more additional electrodes located on the periphery of the semiconductor wafer that are used to make adjustments at the edge of the wafer to account for anomalies, such as the wafer notch or other pattern variations). Therefore, the measurement data 316 may include measurements at a plurality of different radii throughout the first semiconductor wafer 310.

Figure 4:
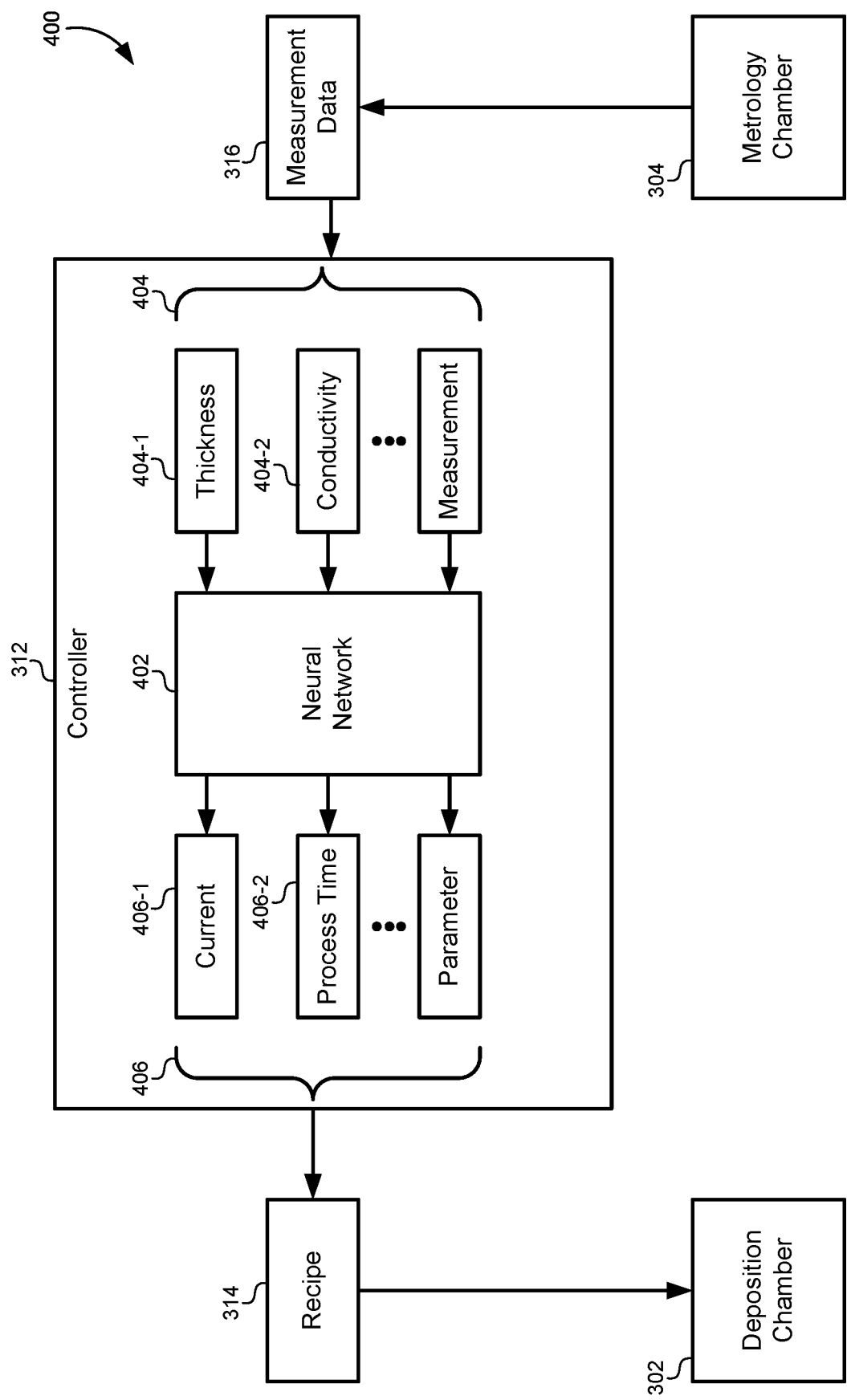
FIG. 4 illustrates a simplified block diagram of a model-based process for optimizing the parameters in the recipe, according to some embodiments.

FIG. 4 illustrates a simplified block diagram 400 of a model-based process for optimizing the parameters in the recipe 314, according to some embodiments. The controller 312 may receive measurement data 316 from the second semiconductor processing station 304. These measurement data 316 may be received after a material has been deposited by the first semiconductor processing station 302, and after the measurements indicative of the thickness of the material have been performed by the second semiconductor processing station 304. The controller may use a trained model that is configured to generate an output that adjusts an operating parameter for the recipe 314 provided to the first semiconductor processing station 302 for subsequent wafers being processed. For example, instead of reusing the same recipe 314 every time, the neural network can evaluate the thickness of the material as indicated by the measurement data 316 and generate an adjustment to an operating parameter, such as a current for a specific anode in the first semiconductor processing station 302, such that the thickness of the material comes closer to or converges towards a target thickness.

The measurement data 316 may include various measurements 404 that are indicative of the thickness of the material. By way of example, the measurements 404 may include a thickness measurement 404-1, a conductivity measurement 404-2, along with any other measurements that may be used to infer a thickness of the material, such as a voltage or resistivity. These measurements 404 may be provided as inputs to a trained model 402, which may be implemented using a multi-layer neural network. Although not shown explicitly, a target thickness for the material may also be provided as an input to the model 402. Alternatively, the target thickness may be combined with one or more of the measurements 404 to generate an error term that is provided as an input to the model 402 as described in greater detail below.

The internal parameters of the model 402 may be trained to generate outputs that cause the error term to be minimized or the thickness of the material to converge to a target thickness. For example, the model 402 may be trained to generate one or more parameters 406, such as a current 406-1 for an anode, a process time 406-2 for a step in the process of the recipe 314, and/or other parameters that may be included in the recipe 314. In one example, a pulse-reverse current waveform may be adjusted to improve the co-planarity within a die. These parameters may then be imported directly into the recipe 314 to be used for a subsequent or second semiconductor wafer. Alternatively, the parameters 402 may instead include an adjustment to an existing parameter in the recipe 314. For example, if the deposited material is too thick, the current 406-1 may represent a reduction in the current through the corresponding anode rather than an absolute current value. The process time 406-2 may represent a decrease/increase in the existing processing time for a corresponding step in the recipe 314.

The model 402 may be trained using previous measurements and recipes executed on semiconductor wafers. For example, the typical semiconductor manufacturing facility may include tools that perform deposition processes on many wafers in parallel as part of a batch of wafers. The training process may label the measurement data 316 from each of these previous processes using the error between the target thickness and the measured thickness. The labeled data may be provided to the model 402 in order to adjust the internal weights of the model 402 so that the model 402 is configured to adjust the parameters (e.g., current, time) to minimize the error term at the input. Some embodiments may also continually train the model 402 during use. The parameter values in the current recipe may be used as training outputs with the measured data 316 as training inputs, which may be labeled by whether the error term falls within an acceptable range.

Figure 5:
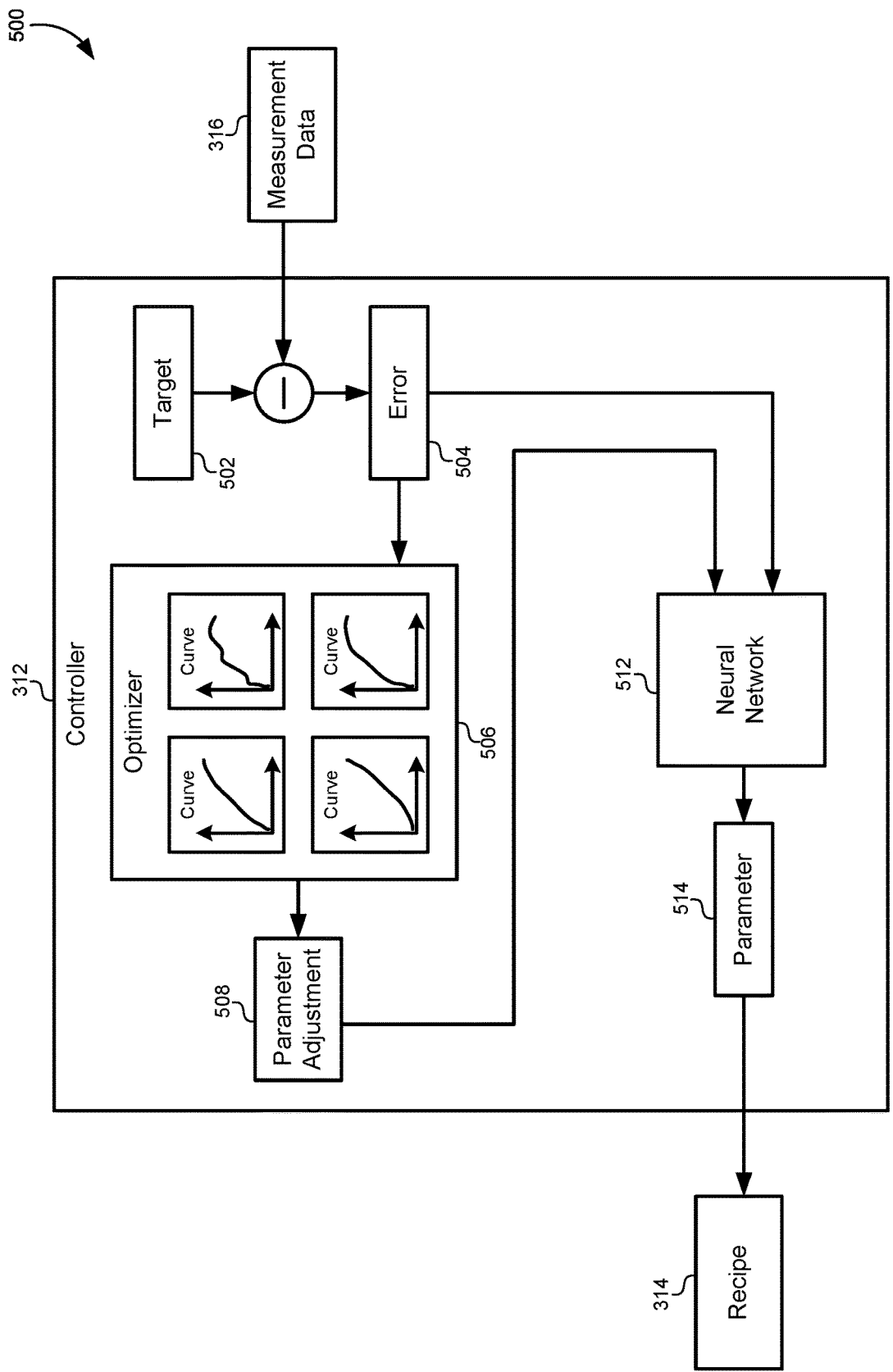
FIG. 5 illustrates a block diagram of a controller that uses a trained model and an optimizer to adjust the recipe parameters, according to some embodiments.

FIG. 5 illustrates a block diagram 500 of a controller 312 that uses a trained model and an optimizer to adjust the recipe parameters, according to some embodiments. As described above, the measurement data 316 may be used to provide or infer a thickness of the material deposited on the semiconductor wafer. This may be compared to a target thickness 502 to generate an error calculation 504. Alternatively, some embodiments may generate the error calculation 504 and detect a difference between any measured value compared to a target value on the first semiconductor wafer, such as a measured conductance versus a target conductance.

The error calculation 504 may be provided to an optimizer 506. The optimizer 506 may include an optimization algorithm that correlates an error term with a predetermined parameter adjustment 508. For example, some embodiments of the optimizer 506 may use sensitivity curves that are generated using data from previous semiconductor manufacturing processes, testing data, and/or simulations. The sensitivity curves may be used to look up a corresponding parameter adjustment 508 on one axis or dimension given a specified error calculation 504 on another axis or dimension. For example, the sensitivity curves may be implemented using lookup tables. Data from the sensitivity curves may be generated previously and stored by the optimizer 506 to generate the parameter adjustment 508 for any of the parameters provided to the recipe 314. For example, a sensitivity curve may relate a thickness error calculation to a parameter adjustment for an electrical current applied to an anode. Another sensitivity curve may relate a thickness error calculation to a time for which a step in the deposition process is performed. The parameter adjustment 508 may be output by the optimizer 506 for use in the recipe.

One potential drawback of the optimizer 506 when operating alone is that the optimizer 506 does not adapt between wafer processes. Thus, using the optimizer 506 alone may take four or more wafers being processed in order for the parameter adjustment 508 to converge such that the measured thickness is within a threshold distance of the target thickness 502. Therefore, some embodiments may augment the operation of the optimizer 506 by using a model 512. The model 512 can further modify the parameter adjustment 508 such that it converges faster than when using the optimizer 506 alone. For example, the combination of the optimizer 506 and the model 512 may cause the parameter value to converge using only one or two wafers. This significantly reduces wafer waste and improves the processing time for a batch of wafers.

The model 512 may receive the parameter adjustment 508 from the optimizer 506 as an input. The model 512 may also receive the error calculation 504 from the measurement data 316 and the target thickness 502. The model 512 may then be trained to refine the parameter adjustment 508 and output either a new parameter adjustment or a value for the parameter 514 to be included in the recipe 314. Because the model 512 is trained continuously in comparison to the relatively static sensitivity curves of the optimizer 506, the model 512 can adapt to the performance of the optimizer 506 as batches of wafers are processed.

Figure 6:
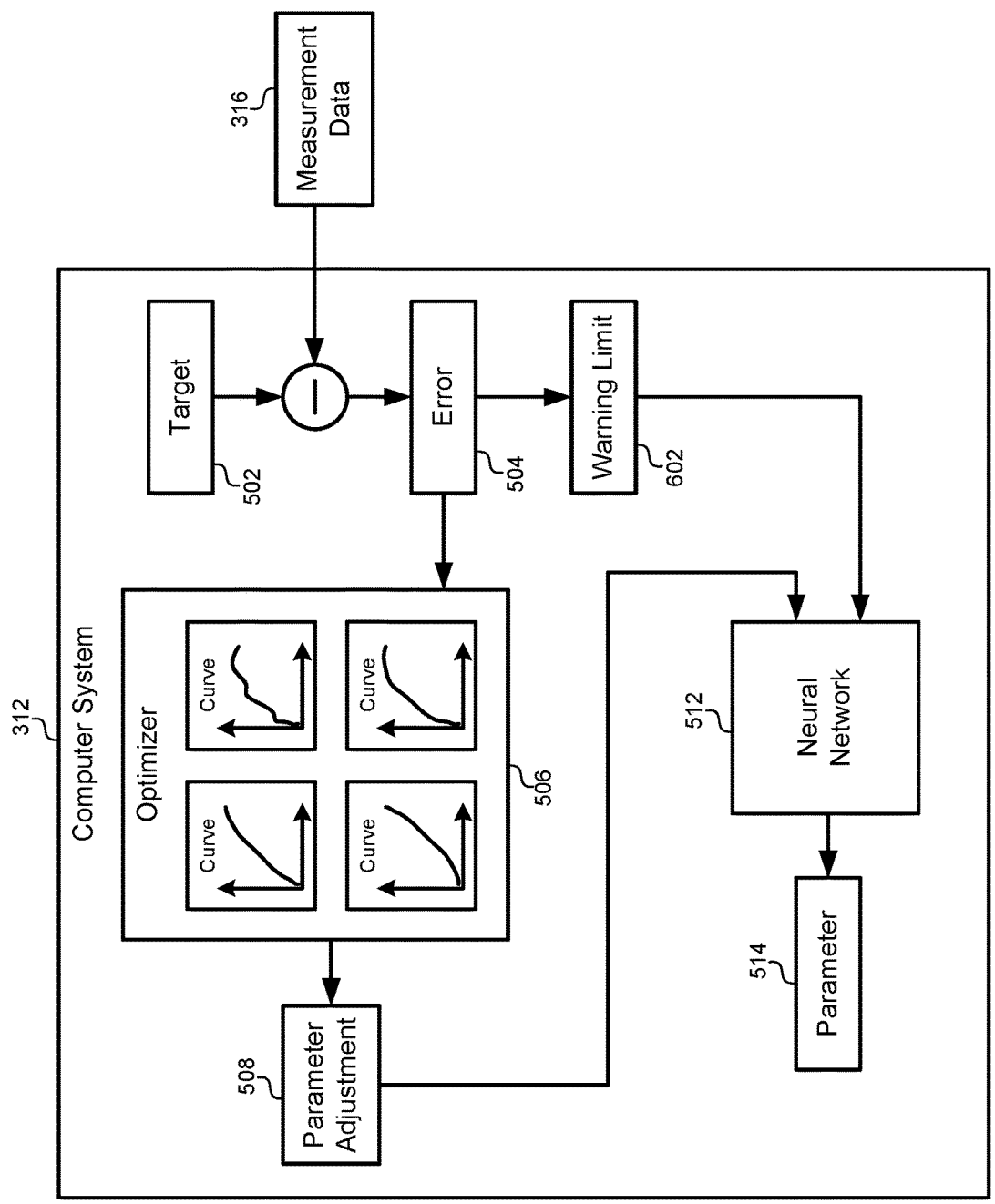
FIG. 6 illustrates how the model may be trained continually using a warning limit, according to some embodiments.

FIG. 6 illustrates how the model 512 may be trained continually using a warning limit 602, according to some embodiments. A warning limit 602 is an industrial term that represents a threshold of acceptability for a manufacturing parameter. As long as the threshold of the warning limit 602 is not violated by the error calculation 504 (e.g., the difference between the measured thickness and the target thickness 502 is less than a threshold amount), then the previous parameter adjustment 508 is deemed to be acceptable. For training purposes, when the error calculation 504 does not violate the threshold of the warning limit 602, the current parameters 514 or parameter adjustment 508 may be used with the current measurement data 316 to train the model 512 as data labeled "good." Conversely, when the error calculation 504 violates the threshold of the warning limit 602, the previous parameter set or adjustment may be used with the current measurement data 316 as training data labeled "bad."

Figure 7:
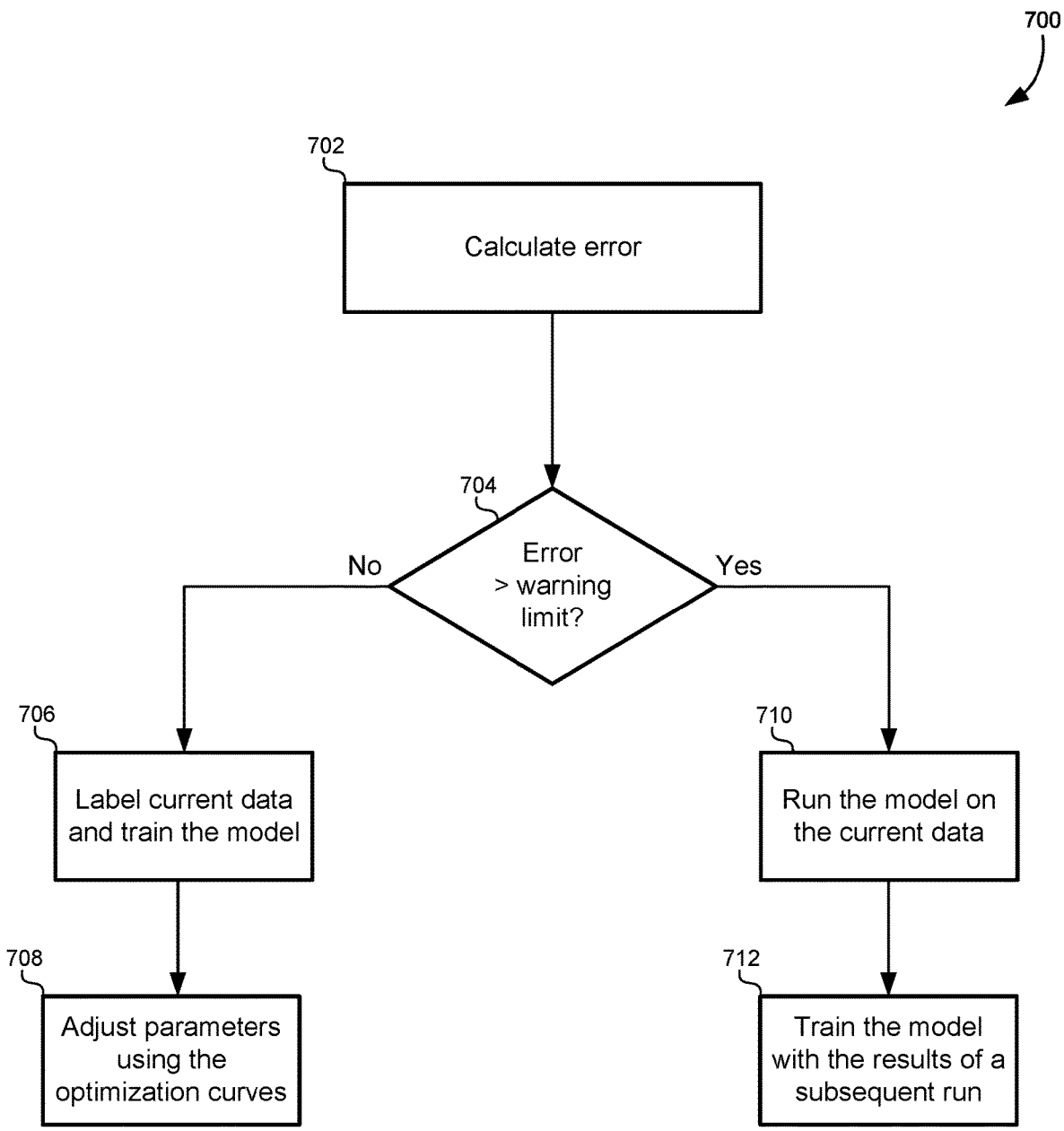
FIG. 7 illustrates a flowchart of a method for training a model using a warning limit, according to some embodiments.

FIG. 7 illustrates a flowchart 700 of a method for training a model using a warning limit, according to some embodiments. As described above, the method may include calculating an error calculation (702) and comparing the error calculation to a threshold of a warning limit (704). If the calculated error does not violate the threshold of the warning limit, no current optimization may need to be performed by the model. Instead, the system can label the current data and train the model with the labeled data as "good" (706). If used in conjunction with an optimizer, the adjuster parameters provided by the optimization curves may or may not be used (708). Alternatively, if the error calculation does violate the threshold of the warning limit, the current measurements may be processed by the model and used to generate a parameter or parameter adjustment for the current recipe (710). A subsequent or second semiconductor processing wafer may then be processed using the parameter adjustment, and the model may be trained using the results of the adjustment made by the model during the current process (712).

Figure 8:
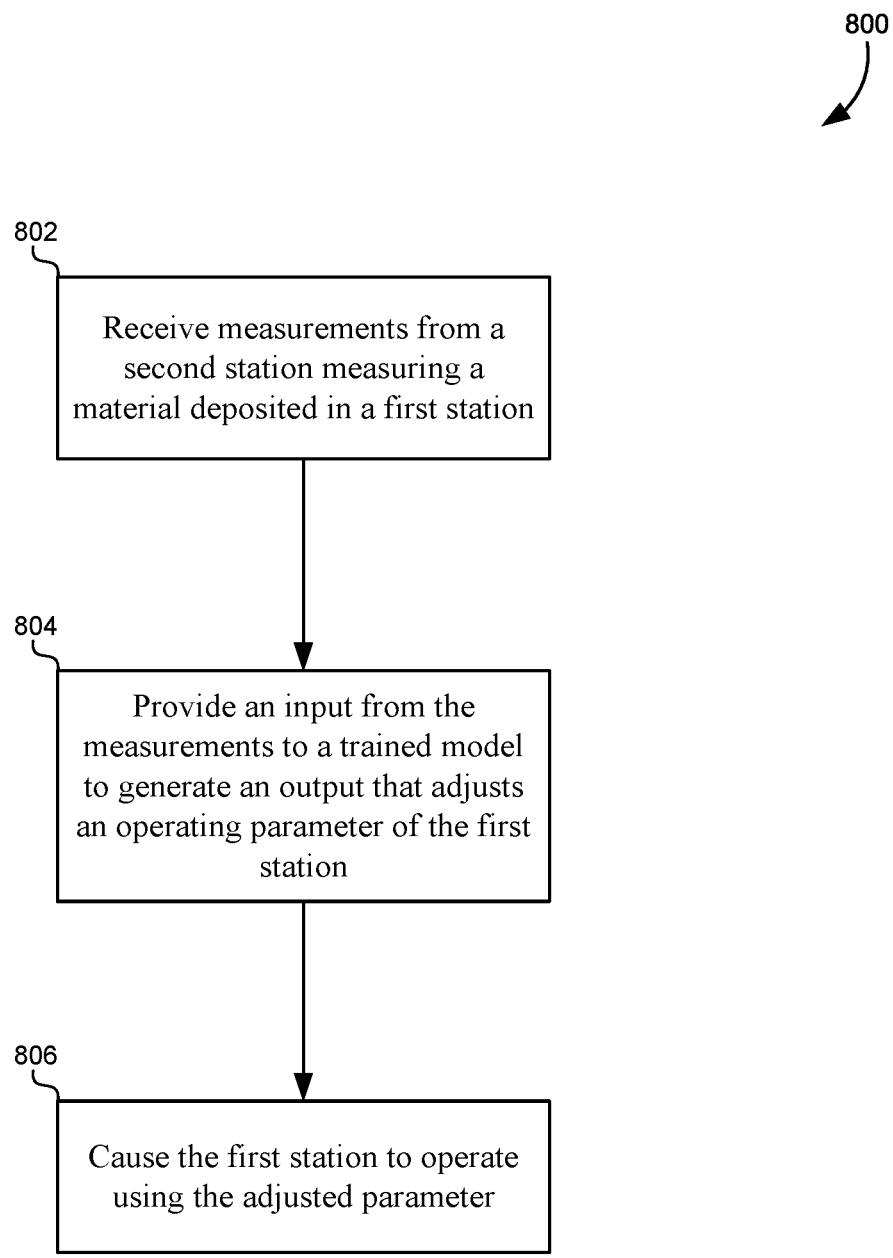
FIG. 8 illustrates a flowchart of a method for adjusting recipe parameters for semiconductor processes, according to some embodiments.

FIG. 8 illustrates a flowchart 800 of a method for adjusting recipe parameters for semiconductor processes, according to some embodiments. The method may include receiving measurements from a second semiconductor processing station (802). The second semiconductor processing station may be configured to perform the measurements indicative of a thickness of a material deposited on a semiconductor wafer by a first semiconductor processing station. As described above, the first semiconductor processing station may include a deposition station, such as an ECD chamber, and the second semiconductor processing station may include a metrology station. These stations may be organized and configured as described above in relation to FIG. 3.

The method may also include providing input based on the measurements to a trained model (804). The trained model may be configured to generate an output that adjusts an operating parameter of the first semiconductor processing station such that the thickness of the material is closer to a target thickness of the material. These measurements may be received, processed, and provided to the model as described above in FIGS. 4-6.

The method may additionally include causing the first semiconductor processing station to deposit the material on the second semiconductor wafer using the operating parameter as adjusted by the output (806). The second semiconductor wafer may be a subsequent wafer that is processed using the updated recipe. As described above in relation to FIGS. 6-7, the results of the current and/or subsequent wafer process may be used to continuously train and refine the model when the thickness or error calculation is compared to a threshold of a warning limit.

It should be appreciated that the specific steps illustrated in FIG. 8 provide particular methods of adjusting parameters of a semiconductor recipe according to various embodiments. Other sequences of steps may also be performed according to alternative embodiments. For example, alternative embodiments may perform the steps outlined above in a different order. Moreover, the individual steps illustrated in FIG. 8 may include multiple sub-steps that may be performed in various sequences as appropriate to the individual step. Furthermore, additional steps may be added or removed depending on the particular applications. Many variations, modifications, and alternatives also fall within the scope of this disclosure.

Each of the methods described herein may be implemented by a computer system. Each step of these methods may be executed automatically by the computer system, and/or may be provided with inputs/outputs involving a user. For example, a user may provide inputs for each step in a method, and each of these inputs may be in response to a specific output requesting such an input, wherein the output is generated by the computer system. Each input may be received in response to a corresponding requesting output. Furthermore, inputs may be received from a user, from another computer system as a data stream, retrieved from a memory location, retrieved over a network, requested from a web service, and/or the like. Likewise, outputs may be provided to a user, to another computer system as a data stream, saved in a memory location, sent over a network, provided to a web service, and/or the like. In short, each step of the methods described herein may be performed by a computer system, and may involve any number of inputs, outputs, and/or requests to and from the computer system which may or may not involve a user. Those steps not involving a user may be said to be performed automatically by the computer system without human intervention. Therefore, it will be understood in light of this disclosure, that each step of each method described herein may be altered to include an input and output to and from a user, or may be done automatically by a computer system without human intervention where any determinations are made by a processor. Furthermore, some embodiments of each of the methods described herein may be implemented as a set of instructions stored on a tangible, non-transitory storage medium to form a tangible software product.

Figure 9:
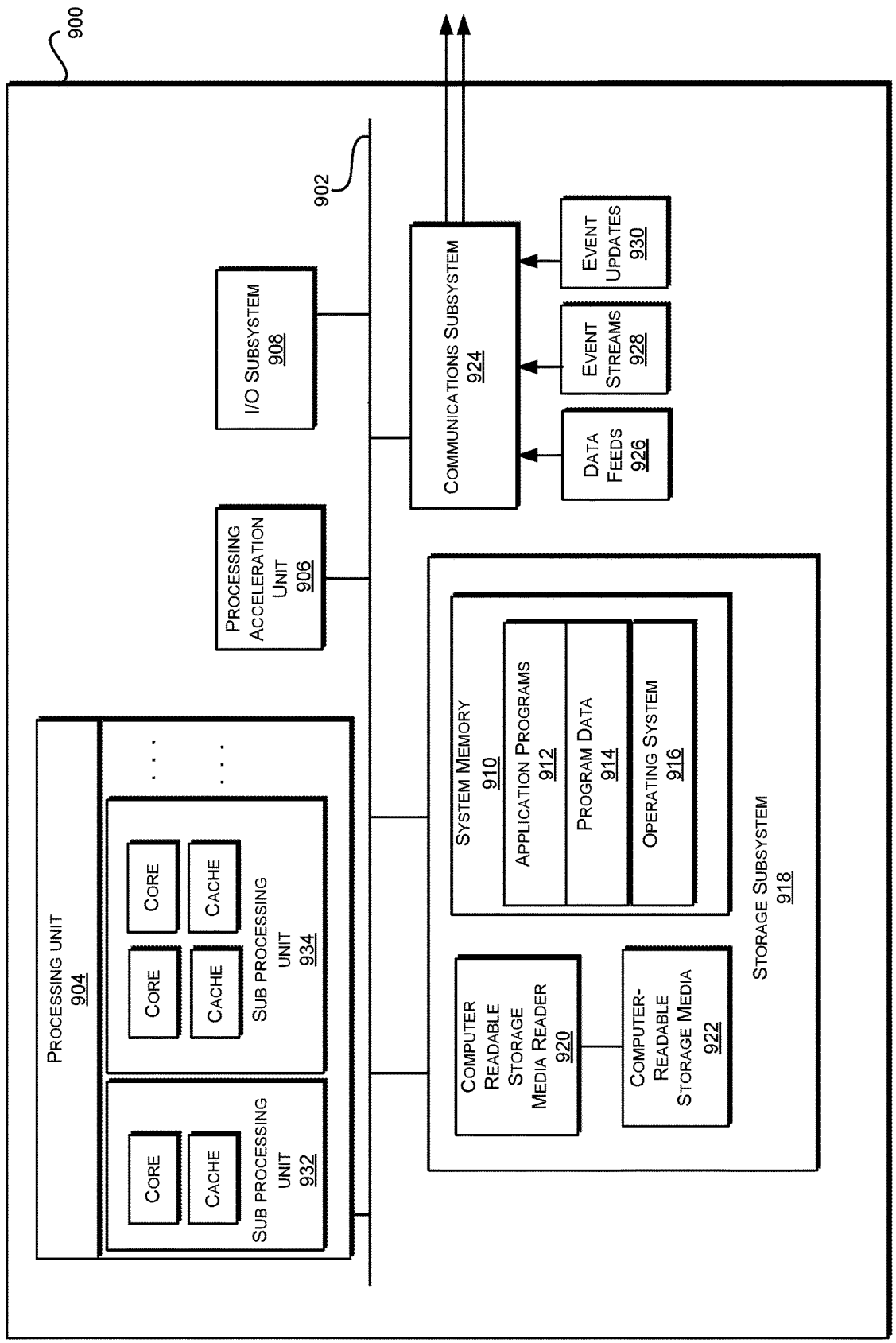
FIG. 9 illustrates an exemplary computer system, in which various embodiments may be implemented.

FIG. 9 illustrates an exemplary computer system 900, in which various embodiments may be implemented. The system 900 may be used to implement any of the computer systems described above. As shown in the figure, computer system 900 includes a processing unit 904 that communicates with a number of peripheral subsystems via a bus subsystem 902. These peripheral subsystems may include a processing acceleration unit 906, an I/O subsystem 908, a storage subsystem 918 and a communications subsystem 924. Storage subsystem 918 includes tangible computer-readable storage media 922 and a system memory 910.

Bus subsystem 902 provides a mechanism for letting the various components and subsystems of computer system 900 communicate with each other as intended. Although bus subsystem 902 is shown schematically as a single bus, alternative embodiments of the bus subsystem may utilize multiple buses. Bus subsystem 902 may be any of several types of bus structures including a memory bus or memory controller, a peripheral bus, and a local bus using any of a variety of bus architectures. For example, such architectures may include an Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus, which can be implemented as a Mezzanine bus manufactured to the IEEE P1386.1 standard.

Processing unit 904, which can be implemented as one or more integrated circuits (e.g., a conventional microprocessor or microcontroller), controls the operation of computer system 900. One or more processors may be included in processing unit 904. These processors may include single core or multicore processors. In certain embodiments, processing unit 904 may be implemented as one or more independent processing units 932 and/or 934 with single or multicore processors included in each processing unit. In other embodiments, processing unit 904 may also be implemented as a quad-core processing unit formed by integrating two dual-core processors into a single chip.

In various embodiments, processing unit 904 can execute a variety of programs in response to program code and can maintain multiple concurrently executing programs or processes. At any given time, some or all of the program code to be executed can be resident in processor(s) 904 and/or in storage subsystem 918. Through suitable programming, processor(s) 904 can provide various functionalities described above. Computer system 900 may additionally include a processing acceleration unit 906, which can include a digital signal processor (DSP), a special-purpose processor, and/or the like.

I/O subsystem 908 may include user interface input devices and user interface output devices. User interface input devices may include a keyboard, pointing devices such as a mouse or trackball, a touchpad or touch screen incorporated into a display, a scroll wheel, a click wheel, a dial, a button, a switch, a keypad, audio input devices with voice command recognition systems, microphones, and other types of input devices. User interface input devices may include, for example, motion sensing and/or gesture recognition devices such as the Microsoft Kinect® motion sensor that enables users to control and interact with an input device, such as the Microsoft Xbox® 360 game controller, through a natural user interface using gestures and spoken commands. User interface input devices may also include eye gesture recognition devices such as the Google Glass® blink detector that detects eye activity (e.g., 'blinking' while taking pictures and/or making a menu selection) from users and transforms the eye gestures as input into an input device (e.g., Google Glass®). Additionally, user interface input devices may include voice recognition sensing devices that enable users to interact with voice recognition systems (e.g., Siri® navigator), through voice commands.

User interface input devices may also include, without limitation, three dimensional (3D) mice, joysticks or pointing sticks, gamepads and graphic tablets, and audio/visual devices such as speakers, digital cameras, digital camcorders, portable media players, webcams, image scanners, fingerprint scanners, barcode reader 3D scanners, 3D printers, laser rangefinders, and eye gaze tracking devices. Additionally, user interface input devices may include, for example, medical imaging input devices such as computed tomography, magnetic resonance imaging, position emission tomography, medical ultrasonography devices. User interface input devices may also include, for example, audio input devices such as MIDI keyboards, digital musical instruments and the like.

User interface output devices may include a display subsystem, indicator lights, or non-visual displays such as audio output devices, etc. The display subsystem may be a cathode ray tube (CRT), a flat-panel device, such as that using a liquid crystal display (LCD) or plasma display, a projection device, a touch screen, and the like. In general, use of the term "output device" is intended to include all possible types of devices and mechanisms for outputting information from computer system 900 to a user or other computer. For example, user interface output devices may include, without limitation, a variety of display devices that visually convey text, graphics and audio/video information such as monitors, printers, speakers, headphones, automotive navigation systems, plotters, voice output devices, and modems.

Computer system 900 may comprise a storage subsystem 918 that comprises software elements, shown as being currently located within a system memory 910. System memory 910 may store program instructions that are loadable and executable on processing unit 904, as well as data generated during the execution of these programs.

Depending on the configuration and type of computer system 900, system memory 910 may be volatile (such as random access memory (RAM)) and/or non-volatile (such as read-only memory (ROM), flash memory, etc.) The RAM typically contains data and/or program modules that are immediately accessible to and/or presently being operated and executed by processing unit 904. In some implementations, system memory 910 may include multiple different types of memory, such as static random access memory (SRAM) or dynamic random access memory (DRAM). In some implementations, a basic input/output system (BIOS), containing the basic routines that help to transfer information between elements within computer system 900, such as during start-up, may typically be stored in the ROM. By way of example, and not limitation, system memory 910 also illustrates application programs 912, which may include client applications, Web browsers, mid-tier applications, relational database management systems (RDBMS), etc., program data 914, and an operating system 916. By way of example, operating system 916 may include various versions of Microsoft Windows®, Apple Macintosh®, and/or Linux operating systems, a variety of commercially-available UNIX® or UNIX-like operating systems (including without limitation the variety of GNU/Linux operating systems, the Google Chrome® OS, and the like) and/or mobile operating systems such as iOS, Windows® Phone, Android® OS, BlackBerry® 10 OS, and Palm® OS operating systems.

Storage subsystem 918 may also provide a tangible computer-readable storage medium for storing the basic programming and data constructs that provide the functionality of some embodiments. Software (programs, code modules, instructions) that when executed by a processor provide the functionality described above may be stored in storage subsystem 918. These software modules or instructions may be executed by processing unit 904. Storage subsystem 918 may also provide a repository for storing data used in accordance with some embodiments.

Storage subsystem 900 may also include a computer-readable storage media reader 920 that can further be connected to computer-readable storage media 922. Together and, optionally, in combination with system memory 910, computer-readable storage media 922 may comprehensively represent remote, local, fixed, and/or removable storage devices plus storage media for temporarily and/or more permanently containing, storing, transmitting, and retrieving computer-readable information.

Computer-readable storage media 922 containing code, or portions of code, can also include any appropriate media, including storage media and communication media, such as but not limited to, volatile and non-volatile, removable and non-removable media implemented in any method or technology for storage and/or transmission of information. This can include tangible computer-readable storage media such as RAM, ROM, electronically erasable programmable ROM (EEPROM), flash memory or other memory technology, CD-ROM, digital versatile disk (DVD), or other optical storage, magnetic cassettes, magnetic tape, magnetic disk storage or other magnetic storage devices, or other tangible computer readable media. This can also include nontangible computer-readable media, such as data signals, data transmissions, or any other medium which can be used to transmit the desired information and which can be accessed by computing system 900.

By way of example, computer-readable storage media 922 may include a hard disk drive that reads from or writes to non-removable, nonvolatile magnetic media, a magnetic disk drive that reads from or writes to a removable, nonvolatile magnetic disk, and an optical disk drive that reads from or writes to a removable, nonvolatile optical disk such as a CD ROM, DVD, and Blu-Ray® disk, or other optical media. Computer-readable storage media 922 may include, but is not limited to, Zip® drives, flash memory cards, universal serial bus (USB) flash drives, secure digital (SD) cards, DVD disks, digital video tape, and the like. Computer-readable storage media 922 may also include, solid-state drives (SSD) based on non-volatile memory such as flash-memory based SSDs, enterprise flash drives, solid state ROM, and the like, SSDs based on volatile memory such as solid state RAM, dynamic RAM, static RAM, DRAM-based SSDs, magnetoresistive RAM (MRAM) SSDs, and hybrid SSDs that use a combination of DRAM and flash memory based SSDs. The disk drives and their associated computer-readable media may provide non-volatile storage of computer-readable instructions, data structures, program modules, and other data for computer system 900.

Communications subsystem 924 provides an interface to other computer systems and networks. Communications subsystem 924 serves as an interface for receiving data from and transmitting data to other systems from computer system 900. For example, communications subsystem 924 may enable computer system 900 to connect to one or more devices via the Internet. In some embodiments communications subsystem 924 can include radio frequency (RF) transceiver components for accessing wireless voice and/or data networks (e.g., using cellular telephone technology, advanced data network technology, such as 3G, 4G or EDGE (enhanced data rates for global evolution), WiFi (IEEE 802.11 family standards, or other mobile communication technologies, or any combination thereof), global positioning system (GPS) receiver components, and/or other components. In some embodiments communications subsystem 924 can provide wired network connectivity (e.g., Ethernet) in addition to or instead of a wireless interface.

In some embodiments, communications subsystem 924 may also receive input communication in the form of structured and/or unstructured data feeds 926, event streams 928, event updates 930, and the like on behalf of one or more users who may use computer system 900.

By way of example, communications subsystem 924 may be configured to receive data feeds 926 in real-time from users of social networks and/or other communication services such as Twitter® feeds, Facebook® updates, web feeds such as Rich Site Summary (RSS) feeds, and/or real-time updates from one or more third party information sources.

Additionally, communications subsystem 924 may also be configured to receive data in the form of continuous data streams, which may include event streams 928 of real-time events and/or event updates 930, that may be continuous or unbounded in nature with no explicit end. Examples of applications that generate continuous data may include, for example, sensor data applications, financial tickers, network performance measuring tools (e.g. network monitoring and traffic management applications), clickstream analysis tools, automobile traffic monitoring, and the like.

Communications subsystem 924 may also be configured to output the structured and/or unstructured data feeds 926, event streams 928, event updates 930, and the like to one or more databases that may be in communication with one or more streaming data source computers coupled to computer system 900.

Computer system 900 can be one of various types, including a handheld portable device (e.g., an iPhone® cellular phone, an iPad® computing tablet, a PDA), a wearable device (e.g., a Google Glass® head mounted display), a PC, a workstation, a mainframe, a kiosk, a server rack, or any other data processing system.

Due to the ever-changing nature of computers and networks, the description of computer system 900 depicted in the figure is intended only as a specific example. Many other configurations having more or fewer components than the system depicted in the figure are possible. For example, customized hardware might also be used and/or particular elements might be implemented in hardware, firmware, software (including applets), or a combination. Further, connection to other computing devices, such as network input/output devices, may be employed. Based on the disclosure and teachings provided herein, other ways and/or methods to implement the various embodiments should be apparent.

In the foregoing description, for the purposes of explanation, numerous specific details were set forth in order to provide a thorough understanding of various embodiments. It will be apparent, however, that some embodiments may be practiced without some of these specific details. In other instances, well-known structures and devices are shown in block diagram form.

The foregoing description provides exemplary embodiments only, and is not intended to limit the scope, applicability, or configuration of the disclosure. Rather, the foregoing description of various embodiments will provide an enabling disclosure for implementing at least one embodiment. It should be understood that various changes may be made in the function and arrangement of elements without departing from the spirit and scope of some embodiments as set forth in the appended claims.

Specific details are given in the foregoing description to provide a thorough understanding of the embodiments. However, it will be understood that the embodiments may be practiced without these specific details. For example, circuits, systems, networks, processes, and other components may have been shown as components in block diagram form in order not to obscure the embodiments in unnecessary detail. In other instances, well-known circuits, processes, algorithms, structures, and techniques may have been shown without unnecessary detail in order to avoid obscuring the embodiments.

Also, it is noted that individual embodiments may have beeen described as a process which is depicted as a flowchart, a flow diagram, a data flow diagram, a structure diagram, or a block diagram. Although a flowchart may have described the operations as a sequential process, many of the operations can be performed in parallel or concurrently. In addition, the order of the operations may be re-arranged. A process is terminated when its operations are completed, but could have additional steps not included in a figure. A process may correspond to a method, a function, a procedure, a subroutine, a subprogram, etc. When a process corresponds to a function, its termination can correspond to a return of the function to the calling function or the main function.

The term "computer-readable medium" includes, but is not limited to portable or fixed storage devices, optical storage devices, wireless channels and various other mediums capable of storing, containing, or carrying instruction(s) and/or data. A code segment or machine-executable instructions may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc., may be passed, forwarded, or transmitted via any suitable means including memory sharing, message passing, token passing, network transmission, etc.

Furthermore, embodiments may be implemented by hardware, software, firmware, middleware, microcode, hardware description languages, or any combination thereof. When implemented in software, firmware, middleware or microcode, the program code or code segments to perform the necessary tasks may be stored in a machine readable medium. A processor(s) may perform the necessary tasks.

In the foregoing specification, features are described with reference to specific embodiments thereof, but it should be recognized that not all embodiments are limited thereto. Various features and aspects of some embodiments may be used individually or jointly. Further, embodiments can be utilized in any number of environments and applications beyond those described herein without departing from the broader spirit and scope of the specification. The specification and drawings are, accordingly, to be regarded as illustrative rather than restrictive.

Additionally, for the purposes of illustration, methods were described in a particular order. It should be appreciated that in alternate embodiments, the methods may be performed in a different order than that described. It should also be appreciated that the methods described above may be performed by hardware components or may be embodied in sequences of machine-executable instructions, which may be used to cause a machine, such as a general-purpose or special-purpose processor or logic circuits programmed with the instructions to perform the methods. These machine-executable instructions may be stored on one or more machine readable mediums, such as CD-ROMs or other type of optical disks, floppy diskettes, ROMs, RAMs, EPROMs, EEPROMs, magnetic or optical cards, flash memory, or other types of machine-readable mediums suitable for storing electronic instructions. Alternatively, the methods may be performed by a combination of hardware and software.

What is claimed is:

1. A system comprising:
   a first semiconductor processing station configured to deposit a material on a first semiconductor wafer;
   a second semiconductor processing station configured to perform measurements indicative of a thickness of the material after the material has been deposited on the first semiconductor wafer; and
   a controller configured to perform operations comprising:
      receiving the measurements from the second semiconductor processing station;
      generating an error calculation using the measurements and a target value for the first semiconductor wafer;
      providing the error calculation to an optimizer that is configured to use one or more sensitivity curves that relate the error calculation to a change in an operating parameter of the first semiconductor processing station;
      providing the change in the operating parameter to a trained model, wherein the trained model is configured to generate an output that adjusts the operating parameter of the first semiconductor processing station such that the thickness of the material is closer to a target thickness of the material; and
      causing the first semiconductor processing station to deposit the material on a second semiconductor wafer using the operating parameter as adjusted by the output.

2. The system of claim 1, wherein the first semiconductor processing station comprises an electrochemical deposition station.

3. The system of claim 1, wherein the second semiconductor processing station comprises a metrology station that performs parametric measurements on the first semiconductor wafer.

4. The system of claim 1, further comprising a third semiconductor processing station configured to remove a photoresist layer from the first semiconductor wafer, wherein the third semiconductor processing station receives the first semiconductor wafer after being processed by the first semiconductor processing station and before being processed by the second semiconductor processing station.

5. The system of claim 1, further comprising a third semiconductor processing station configured to perform a rinse and dry process on the first semiconductor wafer, wherein the third semiconductor processing station receives the first semiconductor wafer after being processed by the first semiconductor processing station and before being processed by the second semiconductor processing station.

6. The system of claim 1, wherein the measurements indicative of the thickness of the material comprise a step-height measurement of the material.

7. The system of claim 1, wherein the measurements indicative of the thickness of the material comprise a conductivity or resistivity measurement of the material used to extrapolate or calculate the thickness of the material.

8. The system of claim 1, wherein the controller comprises a central computer system that is in communication with the first semiconductor processing station and the second semiconductor processing station.

9. The system of claim 1, wherein the controller comprises a first integrated controller for the first semiconductor processing station in communication with a second integrated controller for the second semiconductor processing station.

10. The system of claim 1, wherein the output that adjusts the operating parameter of the first semiconductor processing station comprises a current to be applied to an anode of the first semiconductor processing station.

11. The system of claim 1, wherein the output that adjusts the operating parameter of the first semiconductor station comprises a process time for a step in a recipe executed by the first semiconductor processing station.

12. The system of claim 1, wherein the trained model comprises a neural network.

13. The system of claim 1, wherein the operations further comprise providing the change and the error calculation to the trained model to generate the output that adjusts the operating parameter of the first semiconductor processing station.

14. The system of claim 1, wherein the operations further comprise:
   determining whether the error calculation violates a threshold; and
   training the model using the change in the operating parameter as labeled data that does not require an adjustment by the trained model.

15. The system of claim 1, wherein the first semiconductor processing station comprises an electrochemical deposition station, and the second semiconductor processing station comprises a metrology station that performs parametric measurements on the first semiconductor wafer.

16. The system of claim 1, wherein the measurements indicative of the thickness of the material comprise a step-height measurement of the material, or a conductivity or resistivity measurement of the material used to extrapolate or calculate the thickness of the material.

17. A method of adjusting recipe parameters for a semiconductor process, the method comprising:
receiving measurements from a second semiconductor processing station, wherein:
a first semiconductor processing station is configured to deposit a material on a first semiconductor wafer; and
the second semiconductor processing station is configured to perform the measurements indicative of a thickness of the material after the material has been deposited on the first semiconductor wafer;

generating an error calculation using the measurements and a target value for the first semiconductor wafer;

providing the error calculation to an optimizer that is configured to use one or more sensitivity curves that relate the error calculation to a change in an operating parameter of the first semiconductor processing station;

providing the change in the operating parameter to a trained model, wherein the trained model is configured to generate an output that adjusts the operating parameter of the first semiconductor processing station such that the thickness of the material is closer to a target thickness of the material; and causing the first semiconductor processing station to deposit the material on a second semiconductor wafer using the operating parameter as adjusted by the output.

* * * * *